United States Patent
Yu et al.

(10) Patent No.: US 10,664,443 B2
(45) Date of Patent: May 26, 2020

(54) METHOD AND APPARATUS FOR PRESENTING TO-BE-CLEANED DATA, AND ELECTRONIC DEVICE

(71) Applicant: Beijing Kingsoft Internet Security Software Co., Ltd., Beijing (CN)

(72) Inventors: Qingqing Yu, Beijing (CN); Xin Ruan, Beijing (CN)

(73) Assignee: Beijing Kingsoft Internet Security Software Co., Ltd., Beijing (CN)

( * ) Notice: Subject to any disclaimer, the term of this patent is extended or adjusted under 35 U.S.C. 154(b) by 271 days.

(21) Appl. No.: 15/752,541

(22) PCT Filed: Aug. 24, 2016

(86) PCT No.: PCT/CN2016/096555
§ 371 (c)(1),
(2) Date: Feb. 13, 2018

(87) PCT Pub. No.: WO2017/032312
PCT Pub. Date: Mar. 2, 2017

(65) Prior Publication Data
US 2019/0012325 A1    Jan. 10, 2019

(30) Foreign Application Priority Data
Aug. 27, 2015   (CN) .......................... 2015 1 0536565

(51) Int. Cl.
G06F 16/16    (2019.01)
G06F 3/06    (2006.01)
G06F 16/17    (2019.01)

(52) U.S. Cl.
CPC .......... G06F 16/162 (2019.01); G06F 3/0605 (2013.01); G06F 3/0652 (2013.01);
(Continued)

(58) Field of Classification Search
None
See application file for complete search history.

(56) References Cited

U.S. PATENT DOCUMENTS 9,417,947 B1 *  8/2016  Massicotte .......... G06F 11/0769
2005/0271359 A1 * 12/2005  Nakai ...................... G11B 5/86
386/240

(Continued)

FOREIGN PATENT DOCUMENTS

CN    102880713 A    1/2013
CN    102929980 A    2/2013
(Continued)

*Primary Examiner* — Wilson Lee
(74) *Attorney, Agent, or Firm* — Bret E. Field; Bozicevic, Field & Francis LLP

(57) ABSTRACT

Embodiments of the present application disclose a method, an apparatus and an electronic device for presenting to-be-cleaned data. The method comprises: after identifying the to-be-cleaned data comprising to-be-cleaned files and to-be-cleaned folders in storage space of the electronic device, determining first-type feature information of the to-be-cleaned files and second-type feature information of the to-be-cleaned folders are (S101); determining data categories of the to-be-cleaned files based on the obtained first-type feature information of the to-be-cleaned files (S102); determining data categories of the to-be-cleaned folders based on the obtained second-type feature information of the to-be-cleaned folders (S103); presenting the to-be-cleaned files and the to-be-cleaned folders in accordance with an order set based on data categories and with a rule of presenting to-be-cleaned data of a same data category in a centralized manner (S104). The effectiveness of processing the to-be-cleaned data by a user can be improved.

13 Claims, 3 Drawing Sheets

(52) U.S. Cl.
CPC .......... *G06F 3/0653* (2013.01); *G06F 3/0673* (2013.01); *G06F 16/164* (2019.01); *G06F 16/1727* (2019.01)

(56) References Cited

U.S. PATENT DOCUMENTS

| | | | |
|---|---|---|---|
| 2006/0095331 A1* | 5/2006 | O'Malley | G06Q 20/20 705/22 |
| 2006/0161570 A1* | 7/2006 | Venguerov | G06Q 10/00 |
| 2007/0013967 A1* | 1/2007 | Ebaugh | G06Q 10/10 358/448 |
| 2008/0168024 A1* | 7/2008 | Petty | H04N 1/00236 |
| 2008/0215598 A1* | 9/2008 | Haga | G06F 3/1205 |
| 2010/0030814 A1* | 2/2010 | Wong | G06Q 10/107 707/802 |
| 2011/0014972 A1* | 1/2011 | Herrmann | G06Q 30/0224 463/25 |
| 2013/0061173 A1* | 3/2013 | Tomita | G06F 16/176 715/810 |
| 2014/0047422 A1* | 2/2014 | Ravi | G06F 8/443 717/151 |

FOREIGN PATENT DOCUMENTS

| | | |
|---|---|---|
| CN | 103279497 A | 9/2013 |
| CN | 103902564 A | 7/2014 |
| CN | 104317840 A | 1/2015 |
| CN | 105045928 A | 11/2015 |

\* cited by examiner

METHOD AND APPARATUS FOR PRESENTING TO-BE-CLEANED DATA, AND ELECTRONIC DEVICE

The present application claims the priority to Chinese patent application No. 201510536565.6, filed with the State Intellectual Property Office of People's Republic of China on Aug. 27, 2015 and entitled "METHOD, DEVICE AND ELECTRONIC EQUIPMENT FOR PRESENTING TO-BE-CLEANED DATA", which is incorporated herein by reference in its entirety.

TECHNICAL FIELD

The present application relates to the field of data processing, and in particular to a method, apparatus and electronic device for presenting to-be-cleaned data.

BACKGROUND

With rapid development of science and technology, a variety of electronic devices continually enrich and facilitate people's lives. Since processing information with electronic devices is convenient and efficient and saves resources, electronic devices have become an indispensable part of people's lives or work.

Data (files or folders) are usually cached or generated during runtime of an application/system in an electronic device, and the data will be automatically stored in corresponding storage space. However, the capacity of the storage space in the electronic device is somewhat limited. Therefore, in order to free storage space to ensure the system or application running normally, the storage space needs to be cleaned up. As for the cleaning, there are usually two types of data: one is junk data which could be deleted directly; and the other is to-be-cleaned data which require the user to confirm whether to delete. Specifically, the to-be-cleaned data comprise to-be-cleaned files and to-be-cleaned folders. For to-be-cleaned data, in order to avoid mistakenly deleting the data, after identification, the to-be-cleaned data are typically presented to the user in a determined order of the to-be-cleaned data, and then the user determines whether to delete.

However, since the presentation only based on a determined order of the to-be-cleaned data, there is no presentation regularity, which will cause jump thinking of the user when processing the to-be-cleaned data, and ultimately affect the effectiveness of processing the to-be-cleaned data by the user, such as deleting or not deleting by mistaken.

SUMMARY

As to the above problem, embodiments of the present application disclose a method, an apparatus and an electronic device for presenting to-be-cleaned data, to improve the efficiency of processing to-be-cleaned data by a user. The technical solution is as follows:

In a first aspect, an embodiment of the present application provides a method for presenting to-be-cleaned data which is applied to an electronic device. The method comprises:

after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

determining data categories of the to-be-cleaned files based on the obtained first-type feature information of the to-be-cleaned files;

determining data categories of the to-be-cleaned folders based on the obtained second-type feature information of the to-be-cleaned folders;

presenting the to-be-cleaned files and the to-be-cleaned folders in accordance with an order set based on the data categories and with a rule of presenting to-be-cleaned data of a same data category in a centralized manner.

Optionally, presenting the to-be-cleaned files and the to-be-cleaned folders in accordance with an order set based on the data categories and with a rule of presenting to-be-cleaned data of a same data category in a centralized manner, comprises:

determining creation time of the to-be-cleaned files and the to-be-cleaned folders;

presenting the to-be-cleaned files and the to-be-cleaned folders in accordance with an order set based on the data categories and with a rule of presenting to-be-cleaned data of a same data category, which are sorted based on the creation time, in a centralized manner.

Optionally, presenting the to-be-cleaned files and the to-be-cleaned folders in accordance with an order set based on the data categories and with a rule of presenting to-be-cleaned data of a same data category in a centralized manner, comprises:

determining data sizes of the to-be-cleaned files and the to-be-cleaned folders;

presenting the to-be-cleaned files and the to-be-cleaned folders in accordance with an order set based on the data categories and with a rule of presenting to-be-cleaned data of a same data category, which are sorted based on the data sizes, in a centralized manner.

Optionally, the data categories comprise: a first category of data being a reloadable file/folder, a second category of data being a personal file/folder, a third category of data other than the first category of data and the second category of data;

wherein the reloadable file/folder comprises a file/folder that can be automatically generated and automatically loaded again after having been deleted;

the personal file/folder comprises at least one of: a folder which is generated during runtime of application software to store files created by a user; a folder created by a user in a folder of application software to store files created by the user; and a file created by a user.

Optionally, the order comprises:

an order of categories of data: the first category of data, the third category of data, and the second category of data.

Optionally, the first-type feature information comprises at least one of: a file type, a file path, and a file name;

the second-type feature information comprises at least one of: a folder name, a folder path, and a file type within a folder.

Optionally identifying the to-be-cleaned data comprising to-be-cleaned files and to-be-cleaned folders located in the storage space of the electronic device, comprises:

scanning files and folders located in the storage space of the electronic device;

obtaining data sizes and third-type feature information of the scanned files, and fourth-type feature information of the scanned folders;

determining folders, among the scanned folders, whose fourth-type feature information conforms to preset folder feature information as operational folders;

determining folders, among the determined operational folders, which do not conform to a preset conventional junk judging condition as intermediate folders;

determining whether each of the intermediate folders is a to-be-cleaned folder based on data sizes of files it contains;

determining files, other than files in operational folders, whose data sizes exceed a first predetermined data size threshold and whose third-type feature information does not conform to preset file feature information as to-be-cleaned files;

determining the to-be-cleaned files and the to-be-cleaned folders as the to-be-cleaned data.

In a second aspect, a present embodiment provides an apparatus for presenting to-be-cleaned data which is applied to an electronic device, the apparatus comprises:

a feature information determining module, used for, after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

a first data category determining module, used for determining data categories of the to-be-cleaned files based on the obtained first-type feature information of the to-be-cleaned files;

a second data category determining module, used for determining data categories of the to-be-cleaned folders based on the obtained second-type feature information of the to-be-cleaned folders;

a data presenting module, used for presenting the to-be-cleaned files and the to-be-cleaned folders in accordance with an order set based on the data categories and with a rule of presenting to-be-cleaned data of a same data category in a centralized manner.

Optionally, the data presenting module comprises:

a creation time determining unit, used for determining creation time of the to-be-cleaned files and the to-be-cleaned folders;

a first data presenting unit, used for presenting the to-be-cleaned files and the to-be-cleaned folders in accordance with an order set based on the data categories and with a rule of presenting to-be-cleaned data of a same data category, which are sorted based on the creation time, in a centralized manner.

Optionally, the data presenting module comprises:

a data size determining unit, used for determining data sizes of the to-be-cleaned files and the to-be-cleaned folders;

a second data presenting unit, used for presenting the to-be-cleaned files and the to-be-cleaned folders in accordance with an order set based on the data categories and with a rule of presenting to-be-cleaned data of a same data category, which are sorted based on the data sizes, in a centralized manner.

Optionally, the data categories comprise: a first category of data being a reloadable file/folder, a second category of data being a personal file/folder, a third category of data other than the first category of data and the second category of data;

wherein the reloadable file/folder comprises a file/folder that can be automatically generated and automatically loaded again after having been deleted;

the personal file/folder comprises at least one of: a folder which is generated during runtime of application software to store files created by a user; a folder created by a user in a folder of application software to store files created by the user; and a file created by a user.

Optionally, the order comprises:

an order of categories of data: the first category of data, the third category of data, and the second category of data.

Optionally, the first-type feature information comprises at least one of: a file type, a file path, and a file name;

the second-type feature information comprises at least one of: a folder name, a folder path, and a file type within a folder.

Optionally, the feature information determining module comprises a to-be-cleaned data identifying unit for identifying the to-be-cleaned data comprising to-be-cleaned files and to-be-cleaned folders located in the storage space of the electronic device;

the to-be-cleaned data identifying unit comprises:

a scanning subunit, used for scanning files and folders located in the storage space of the electronic device;

a feature information obtaining subunit, used for obtaining data sizes and third-type feature information of the scanned files, and fourth-type feature information of the scanned folders;

an operation folder determining subunit, used for determining folders, among the scanned folders, whose fourth-type feature information conforms to preset folder feature information as operational folders;

an intermediate folder determining subunit, used for determining folders, among the determined operational folders, which do not conform to a preset conventional junk judging condition as intermediate folders;

an intermediate folder processing subunit, used for determining whether each of the intermediate folders is a to-be-cleaned folder based on data sizes of files it contains;

a to-be-cleaned file determining subunit, used for determining files, other than files in operational folders, whose data sizes exceed a first predetermined data size threshold and whose third-type feature information does not conform to preset file feature information as to-be-cleaned files;

a to-be-cleaned data determining subunit, used for determining the to-be-cleaned files and the to-be-cleaned folders as the to-be-cleaned data.

In a third aspect, an embodiment of the present application provides an electronic device, comprising a housing, a processor, a memory, a circuit board and a power supply circuit, wherein the circuit board is disposed inside the space enclosed by the housing, the processor and the memory are provided on the circuit board; the power supply circuit is used for supplying power to various circuits or components of the electronic device, and the memory is used for storing executable program code; the processor executes the program corresponding to the executable program code by reading the executable program code stored in the memory to perform the following steps:

after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

determining data categories of the to-be-cleaned files based on the obtained first-type feature information of the to-be-cleaned files;

determining data categories of the to-be-cleaned folders based on the obtained second-type feature information of the to-be-cleaned folders;

presenting the to-be-cleaned files and the to-be-cleaned folders in accordance with an order set based on the data categories and with a rule of presenting to-be-cleaned data of a same data category in a centralized manner.

In a fourth aspect, an embodiment of the present application provides an application program for performing the method for presenting to-be-cleaned data provided by the embodiments of the present application when being executed. The method for presenting to-be-cleaned data comprises:

after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

determining data categories of the to-be-cleaned files based on the obtained first-type feature information of the to-be-cleaned files;

determining data categories of the to-be-cleaned folders based on the obtained second-type feature information of the to-be-cleaned folders;

presenting the to-be-cleaned files and the to-be-cleaned folders in accordance with an order set based on the data categories and with a rule of presenting to-be-cleaned data of a same data category in a centralized manner.

In a fifth aspect, an embodiment of the present application provides a storage medium for storing executable program code which performs the method for presenting to-be-cleaned data provided by the embodiments when being executed. The method for presenting to-be-cleaned data comprises:

after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

determining data categories of the to-be-cleaned files based on the obtained first-type feature information of the to-be-cleaned files;

determining data categories of the to-be-cleaned folders based on the obtained second-type feature information of the to-be-cleaned folders;

presenting the to-be-cleaned files and the to-be-cleaned folders in accordance with an order set based on the data categories and with a rule of presenting to-be-cleaned data of a same data category in a centralized manner.

In an embodiment of the present application, after identifying the to-be-cleaned data comprising to-be-cleaned files and to-be-cleaned folders located in the storage space of the electronic device, the first-type feature information of the to-be-cleaned files and the second-type feature information of the to-be-cleaned folders are obtained; data categories of the to-be-cleaned files are determined based on the obtained first-type feature information of the to-be-cleaned files; data categories of the to-be-cleaned folders are determined based on the obtained second-type feature information of the to-be-cleaned folders; the to-be-cleaned files and the to-be-cleaned folders are presented in accordance with an order set based on the data categories and with a rule of presenting to-be-cleaned data of a same data category in a centralized manner. Compared with the prior art, the present solution determines the data categories of the to-be-cleaned data based on the feature information of the to-be-cleaned data, and presents the to-be-cleaned data in accordance with an order set based on the data categories and with a rule of presenting to-be-cleaned data of a same data category in a centralized manner, so that the presentation of the to-be-cleaned data has a certain regularity, thereby the efficiency of processing the to-be-cleaned data by a user is improved.

BRIEF DESCRIPTION OF THE DRAWINGS

In order to explain the technical solution of embodiments of the present application or of the prior art more clearly, the figures required to be used in the description of the embodiments or the prior art will be described briefly below. Obviously, the figures described below are just some embodiments of the present application and other figures can be obtained by those skilled in the art based on those figures without any creative efforts.

DETAILED DESCRIPTION

In order to explain the technical solution of the embodiments of the present application and of the prior art more clearly, a simple introduction of the drawings required in the description of the embodiments and of the prior art will be given. Obviously, the drawings described below are merely drawings of some embodiments of the present application. Other drawings can be obtained by those skilled in the art based on these drawings without any creative efforts.

The embodiments of the present application provide a method, an apparatus and an electronic device for presenting to-be-cleaned data, to improve the efficiency of processing the to-be-cleaned data by a user.

First, a method for presenting to-be-cleaned data provided by an embodiment of the present application will be described below.

It should be noted that the method for presenting to-be-cleaned data provided by this embodiment is applied to an electronic device. In practical applications, the electronic device can be: a smart phone, a tablet computer or a laptop, or the like.

The functional software implementing the method for presenting to-be-cleaned data provided by this embodiment can be dedicated client software, or a plug-in for existing cleaning software for cleaning conventional junk data.

Figure 1:
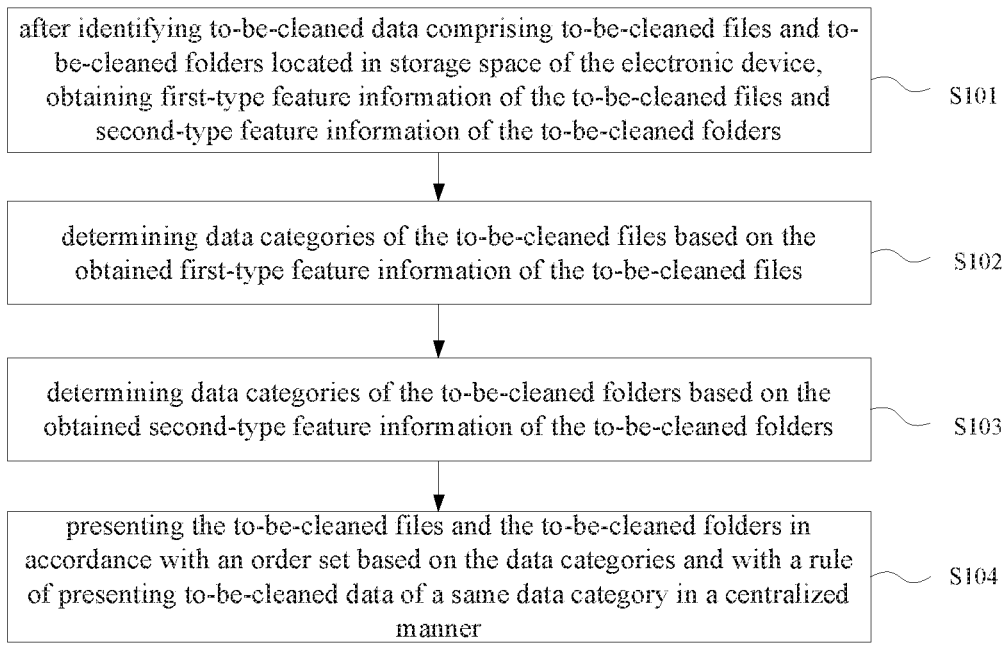
FIG. 1 is a flow chart of a method for presenting to-be-cleaned data provided by an embodiment of the present application.

As shown in FIG. 1, the method for presenting to-be-cleaned data can comprise:

S101, after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

after identifying the to-be-cleaned data comprising to-be-cleaned files and to-be-cleaned folders located in the storage space of the electronic device, the first-type feature information of the to-be-cleaned files and the second-type feature information of the to-be-cleaned folders can be determined to improve the efficiency of processing the to-be-cleaned data by a user, and then subsequent processes are performed based on the determined first-type feature information and second-type feature information.

Specifically, the first-type feature information can comprise at least one of: a file type, a file path, and a filename; the second-type feature information can comprise at least one of: a folder name, a folder path, and a file type within a folder.

It can be understood that the storage space can be a built-in storage space of the electronic device, or can be storage space of an external device, such as an SD card (Secure Digital Memory Card), added by the user to the electronic device, wherein the SD card is a memory card based on a semiconductor flash memory technology.

It should be noted that identifying the to-be-cleaned data comprising to-be-cleaned files and to-be-cleaned folders in the storage space of the electronic device would not be defined in the present application since it does not relates to the inventive concept of the present application. For clarity, identifying the to-be-cleaned data comprising to-be-cleaned files and to-be-cleaned folders in the storage space of the electronic device will be exemplified later.

S102, determining data categories of the to-be-cleaned files based on the obtained first-type feature information of the to-be-cleaned files;

S103, determining data categories of the to-be-cleaned folders based on the obtained second-type feature information of the to-be-cleaned folders;

In order to solve the problems of the prior art, after obtaining the first-type feature information of the to-be-cleaned files and the second-type feature information of the to-be-cleaned folders, data categories of the to-be-cleaned files can be determined based on the first-type feature information of the to-be-cleaned files, and data categories of the to-be-cleaned folders can be determined based on the second-type feature information of the to-be-cleaned folders.

Specifically, the data categories can comprise: a first category of data being a reloadable file/folder, a second category of data being a personal file/folder, a third category of data other than the first category of data and the second category of data;

wherein the reloadable file/folder can comprise: a file/folder that can be automatically generated and automatically loaded again after having been deleted;

the personal file/folder can comprise at least one of: a folder which is generated during runtime of application software to store files created by a user; a folder created by a user in a folder of application software to store files created by the user; and a file created by a user.

For example, after a folder containing the user's avatar of WeChat application has been deleted, the folder would be automatically generated and loaded again when starting WeChat application again. Therefore, the folder containing the user's avatar of WeChat application can be considered as a reloadable folder, and the user's avatar can be considered as a reloadable file.

For example, a folder generated to hold photos taken by a user when the user takes photos with camera software can be considered as a personal folder, and the photos taken by the user can be considered as personal files; or a folder generated to store recorded audio files when a user recodes audio files with recording software can be considered as a personal folder, and the recorded audio files can be considered as personal files.

It should be noted that the first-type feature information of the to-be-cleaned files and the second-type feature information of the to-be-cleaned folders should be determined according to the criteria of the first category of data, the second category of data and the third category of data. The criteria of the first category of data, the second category of data and the third category of data can be determined according to analysis and statistics. The feature information of the files on which the analysis and statistics are based can comprise at least one of: a filename, a file path, and a file type, but not limited thereto. The feature information of the folder on which the analysis and statistics are based can comprise at least one of: a folder name, a folder path, and a file type within a folder, obviously not limited thereto.

S104, presenting the to-be-cleaned files and the to-be-cleaned folders in accordance with an order set based on the data categories and with a rule of presenting to-be-cleaned data of a same data category in a centralized manner.

After determining the data categories of the to-be-cleaned files and the data categories of the to-be-cleaned folders, the to-be-cleaned files and the to-be-cleaned folders can be presented in accordance with an order set based on the data categories and with a rule of presenting to-be-cleaned data of a same data category in a centralized manner, so that the presentation of the to-be-cleaned data has a certain regularity.

Specifically, there is a high possibility that the first category of data and the third category of data would be cleaned according to statistical analyses, thus the first category of data and the third category of data are presented before the second category of data. The order can comprise an order of categories of data: the first category of data, the third category of data, and the second category of data. Of course, in practical applications, other orders can be adopted according to different requirements, for example, the order can be: the second category of data, the third category of data, and the first category of data; or, the order can be: the third category of data, the first category of data, and the second category of data; or, the order can be the second category of data, the first category of data, and the third category of data, or the like.

It should be noted that there are a number of specific implementations for presenting the to-be-cleaned files and the to-be-cleaned folders in accordance with an order set based on the data categories and with a rule of presenting to-be-cleaned data of a same data category in a centralized manner. For clarity, in combination with a specific embodiment, an example of the specific implementation for presenting to-be-cleaned files and to-be-cleaned folders in accordance with an order set based on the data categories and with a rule of presenting to-be-cleaned data of a same data category in a centralized manner will be described below.

In the embodiment of the present application, after identifying the to-be-cleaned data comprising to-be-cleaned files and to-be-cleaned folders located in the storage space of the electronic device, the first-type feature information of the to-be-cleaned files and the second-type feature information of the to-be-cleaned folders are determined; data categories of the to-be-cleaned files are determined based on the obtained first-type feature information of the to-be-cleaned files; data categories of the to-be-cleaned folders are determined based on the obtained second-type feature information of the to-be-cleaned folders; the to-be-cleaned files and the to-be-cleaned folders are presented in accordance with an order set based on the data categories and with a rule of presenting to-be-cleaned data of a same data category in a centralized manner. Compared with the prior art, the present solution determines the data categories of the to-be-cleaned data based on the feature information of the to-be-cleaned data, and presents the to-be-cleaned data in accordance with an order set based on the data categories and with a rule of presenting to-be-cleaned data of a same data category in a centralized manner, so that the presentation of the to-be-cleaned data has a certain regularity, thereby the efficiency of processing the to-be-cleaned data by a user is improved.

A method for presenting to-be-cleaned data provided by an embodiment of the present application will be described below in combination with a specific embodiment.

It should be noted that the method for presenting to-be-cleaned data provided by this embodiment is applied to an electronic device. In practical applications, the electronic device can be: a smart phone, a tablet computer or a laptop, or the like.

The functional software implementing the method for presenting to-be-cleaned data provided by this embodiment can be dedicated client software, or a plug-in for existing cleaning software for cleaning conventional junk data.

Figure 2:
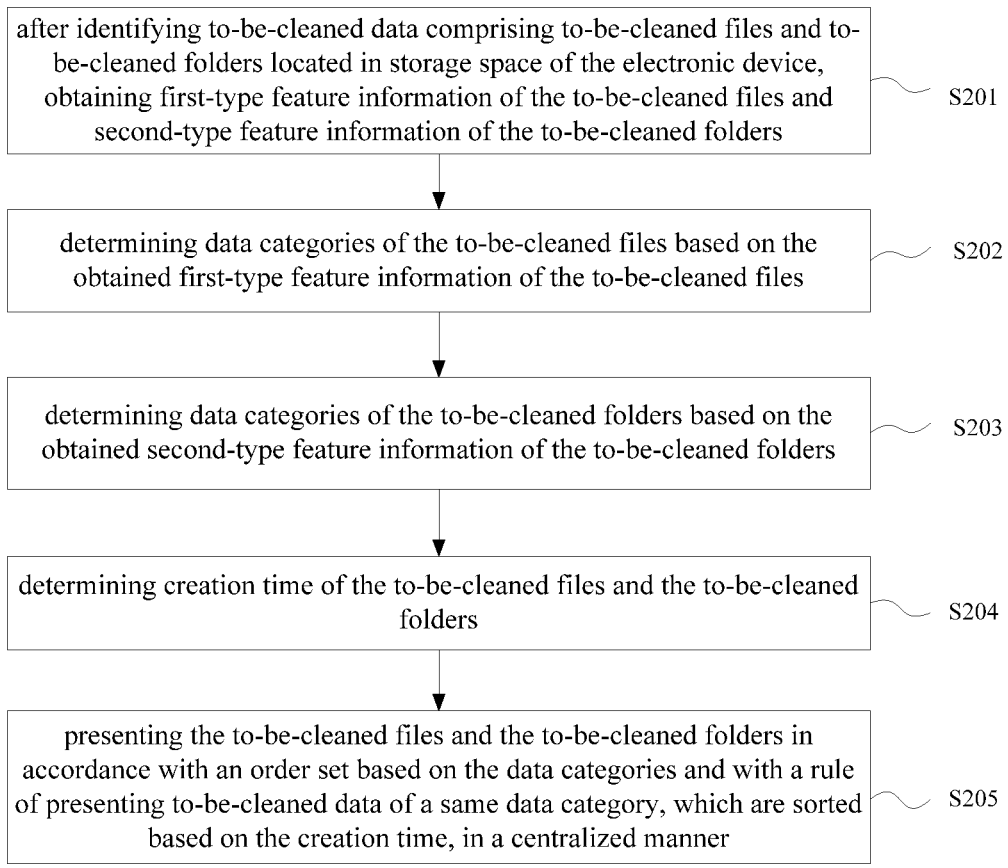
FIG. 2 is another flow chart of a method for presenting to-be-cleaned data provided by an embodiment of the present application.

As shown in FIG. 2, the method for presenting to-be-cleaned data provided by this embodiment can comprise:

S201, after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

S202, determining data categories of the to-be-cleaned files based on the obtained first-type feature information of the to-be-cleaned files;

S203, determining data categories of the to-be-cleaned folders based on the obtained second-type feature information of the to-be-cleaned folders;

In this embodiment, S201 to S203 are similar to S101 to S103 of the embodiment described above, and will not be described herein.

S204, determining creation time of the to-be-cleaned files and the to-be-cleaned folders;

S205, presenting the to-be-cleaned files and the to-be-cleaned folders in accordance with an order set based on the data categories and with a rule of presenting to-be-cleaned data of a same data category, which are sorted based on the creation time, in a centralized manner.

After determining the data categories of the to-be-cleaned files and the data categories of the to-be-cleaned folders, the creation time of the to-be-cleaned files and the to-be-cleaned folders can be further determined, and the to-be-cleaned files and the to-be-cleaned folders can be presented in accordance with an order set based on the data categories and with a rule of presenting to-be-cleaned data of a same data category, which are sorted based on the creation time, in a centralized manner, so that the presentation of the to-be-cleaned data have a certain regularity.

It should be understood that the sorting based on the creation time can be sorting in a chronological or a reverse chronological order of the creation time.

Specifically, there is a high possibility that the first category of data and the third category of data would be cleaned according to statistical analyses, thus the first category of data and the third category of data are presented before the second category of data. The order can comprise an order of categories of data: the first category of data, the third category of data, and the second category of data. Of course, in practical applications, other orders can be adopted according to different requirements, for example, the order can be: the second category of data, the third category of data, and the first category of data; or, the order can be: the third category of data, the first category of data, and the second category of data; or, the order can be the second category of data, the first category of data, and the third category of data, or the like.

Compared with the prior art, the present solution determines the data categories of the to-be-cleaned data based on the feature information of the to-be-cleaned data, and presents the to-be-cleaned files and the to-be-cleaned folders in accordance with an order set based on the data categories and with a rule of presenting to-be-cleaned data of a same data category, which are sorted based on creation time, in a centralized manner, so that the presentation of the to-be-cleaned data has a certain regularity, thereby the efficiency of processing the to-be-cleaned data by a user is improved.

A method for presenting to-be-cleaned data provided by an embodiment of the present application will be described below in combination with another specific embodiment.

It should be noted that the method for presenting to-be-cleaned data provided by the present embodiment is applied to an electronic device. In practical applications, the electronic device can be: a smart phone, a tablet computer or a laptop, or the like.

The functional software implementing the method for presenting to-be-cleaned data provided by this embodiment can be dedicated client software, or a plug-in for existing cleaning software for cleaning conventional junk data.

Figure 3:
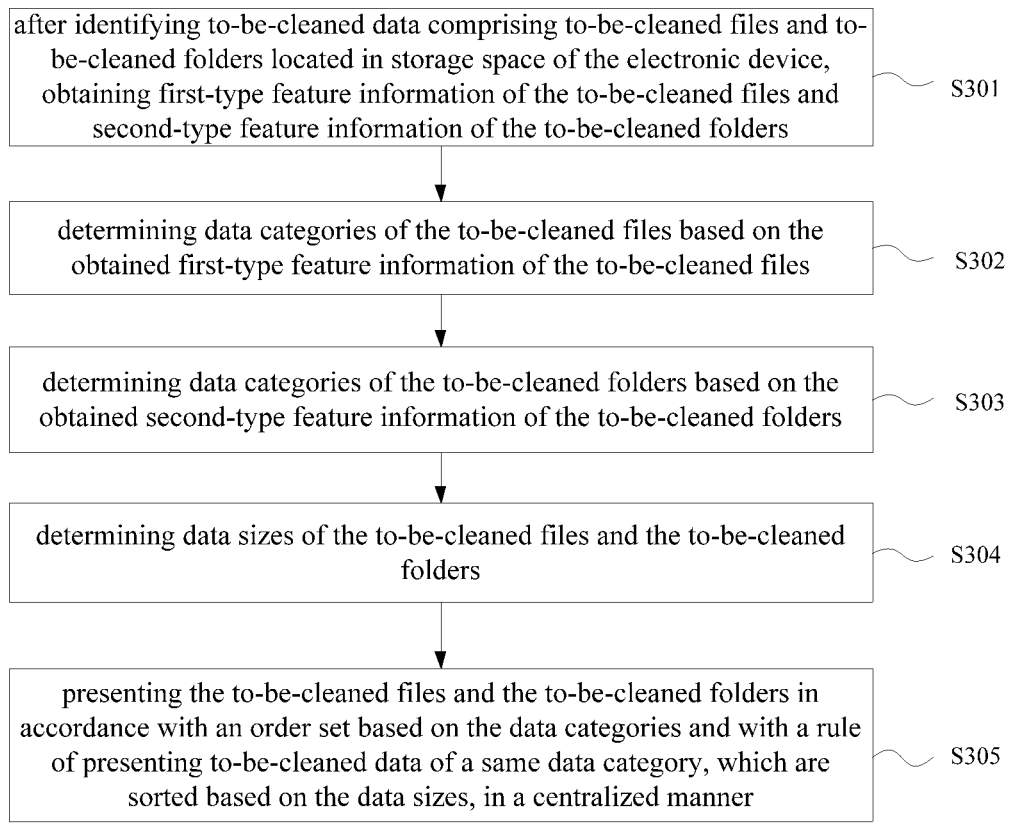
FIG. 3 is still another flow chart of a method for presenting to-be-cleaned data provided by an embodiment of the present application.

As shown in FIG. 3, the method for presenting to-be-cleaned data provided by this embodiment can comprise:

S301, after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

S302, determining data categories of the to-be-cleaned files based on the obtained first-type feature information of the to-be-cleaned files;

S303, determining data categories of the to-be-cleaned folders based on the obtained second-type feature information of the to-be-cleaned folders;

In this embodiment, S301 to S303 are similar to S101 to S103 of the embodiment described above, and will not be described herein.

S304, determining data sizes of the to-be-cleaned files and the to-be-cleaned folders;

S305, presenting the to-be-cleaned files and the to-be-cleaned folders in accordance with an order set based on the data categories and with a rule of presenting to-be-cleaned data of a same data category, which are sorted based on the data sizes, in a centralized manner.

After determining the data categories of the to-be-cleaned files and the data categories of the to-be-cleaned folders, the data sizes of the to-be-cleaned files and the to-be-cleaned folders can be further determined, and the to-be-cleaned files and the to-be-cleaned folders can be presented in accordance with an order set based on the data categories and with a rule of presenting to-be-cleaned data of a same data category, which are sorted based on the data sizes, in a centralized manner, so that the presentation of the to-be-cleaned data has a certain regularity.

It should be understood that sorting based on the data sizes can be sorting in a descending or an ascending order of the data sizes.

Specifically, there is a high possibility that the first category of data and the third category of data would be cleaned according to statistical analyses, thus the first category of data and the third category of data are presented before the second category of data. The order can comprise an order of categories of data: the first category of data, the third category of data, and the second category of data. Of course, in practical applications, other orders can be adopted according to different requirements, for example, the order can be: the second category of data, the third category of data, and the first category of data; or, the order can be: the third category of data, the first category of data, and the second category of data; or, the order can be the second category of data, the first category of data, and the third category of data, or the like.

Compared with the prior art, the present solution determines the data categories of the to-be-cleaned data based on the feature information of the to-be-cleaned data, and presents the to-be-cleaned files and the to-be-cleaned folders in accordance with an order set based on the data categories and with a rule of presenting to-be-cleaned data of a same data category, which are sorted based on data sizes, in a centralized manner, so that the presentation of the to-be-cleaned data has a certain regularity, thereby the efficiency of processing the to-be-cleaned data by a user is improved.

An example of identifying the to-be-cleaned data comprising to-be-cleaned files and to-be-cleaned folders located in the storage space of the electronic device will be described below. Of course, it will be understood by those skilled in the art that identifying the to-be-cleaned data comprising to-be-cleaned files and to-be-cleaned folders located in the storage space of the electronic device can be implemented in other ways.

Specifically identifying the to-be-cleaned data comprising to-be-cleaned files and to-be-cleaned folders in the storage space of the electronic device can comprise:

scanning files and folders located in the storage space of the electronic device;

obtaining data sizes and third-type feature information of the scanned files, and fourth-type feature information of the scanned folders;

determining folders, among the scanned folders, whose fourth-type feature information conforms to preset folder feature information as operational folders;

determining folders, among the determined operational folders, which do not conform to a preset conventional junk judging condition as intermediate folders;

determining whether each of the intermediate folders is a to-be-cleaned folder based on data sizes of files it contains;

determining files, other than files in operational folders, whose data sizes exceed a first predetermined data size threshold and whose third-type feature information does not conform to preset file feature information as to-be-cleaned files;

determining the to-be-cleaned files and the to-be-cleaned folders as the to-be-cleaned data.

The third-type feature information can comprise at least one of: a file type, a file path, and a file name, which is not limited thereto; the fourth-type feature information can comprise at least one of: a folder name, a folder path, a file type within the folder, of course which is not limited thereto.

Specifically, the preset folder feature information can comprise feature information of a parent folder of an application in an operating system, or feature information of a specific folder of the operating system. It should be noted that the feature information of a parent folder in a commonly used application in the operating system and the feature information of a specific folder of the operating system can be analyzed in advance, and the analyzed feature information can be at least one of: a folder name, a folder path, and a file type within the folder; and it should be understood that the fourth feature information is determined based on the analyzed feature information due to a need of matching.

The preset conventional junk judging condition can comprise the conditions: that fourth-type feature information of a folder conforms to feature information of a preset conventional junk folder; or that third-type feature information of a file in a folder conforms to feature information of a preset conventional junk file; or, that fourth-type feature information of a folder conforms to feature information of a preset conventional junk folder and third-type feature information of a file in the folder conforms to feature information of a preset conventional junk file. It should be noted that the operational folders can be analyzed in advance to determine which folders are conventional junk folders containing conventional junk files, and the conventional junk folders can be deleted directly without the user's confirmation. Therefore the conventional junk judging condition can be set in accordance with the determined conventional junk folders, wherein the conventional junk judging condition can be set only based on feature information of the conventional junk folders, or only based on feature information of the conventional junk files in the conventional junk folders, or based on both the feature information of the conventional junk folders and the feature information of the conventional junk files.

Specifically, the preset file feature information can be set based on the feature information of conventional junk files.

Moreover, in one implementation, determining whether each of the intermediate folders is a to-be-cleaned folder based on data sizes of files it contains, can comprise:

determining, for each of the intermediate folders, whether there is a file in the intermediate folder whose data size exceeds a second predetermined data size threshold;

determining the intermediate folder in which there is a file whose data size exceeds the second predetermined data size threshold as a to-be-cleaned folder;

determining the intermediate folder in which there is no file whose data size exceeds the second predetermined data size threshold as a not to-be-cleaned folder;

In another implementation, determining whether each of the intermediate folders is a to-be-cleaned folder based on data sizes of files it contains, can comprise:

determining, for each of the intermediate folders, whether total data size of the files in the intermediate folder exceeds a third predetermined data size threshold;

determining the intermediate folder, the total data size of the files in which exceeds the third predetermined data size threshold, as a to-be-cleaned folder;

determining the intermediate folder, the total data size of the files in which does not exceed the third predetermined data size threshold, as a not to-be-cleaned folder;

In another implementation, determining whether each of the intermediate folders is a to-be-cleaned folder based on data sizes of files it contains, can comprise:

determining, for each of the intermediate folders, whether there is a file in the intermediate folder whose data size exceeds a second predetermined data size threshold;

determining the intermediate folder in which there is a file whose data size exceeds the second predetermined data size threshold as a to-be-cleaned folder;

and determining respectively whether the total data size of files in each of the intermediate folders, in which there is no file whose data size exceeds the second predetermined data size threshold, exceeds the third predetermined data size threshold;

determining the intermediate folder, the total data size of files in which exceeds the third predetermined data size threshold as a to-be-cleaned folder;

determining the intermediate folder, the total data size of files in which does not exceed the third predetermined data size threshold, as a to-be-cleaned folder;

It should be noted again that identifying the to-be-cleaned data comprising to-be-cleaned files and to-be-cleaned folders in the storage space of the electronic device described above is just an example and should not be construed as a limitation of the present application.

Figure 4:
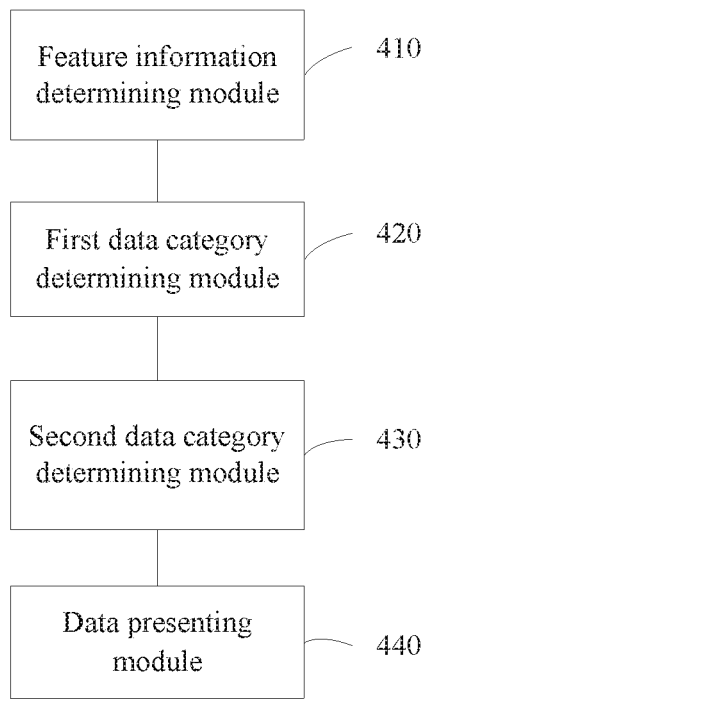
FIG. 4 is a schematic view of the structure of an apparatus for presenting to-be-cleaned data provided by an embodiment of the present application.

Corresponding to the above method embodiments, an embodiment of the present application also provides an apparatus for presenting to-be-cleaned data which is applied to an electronic device, as shown in FIG. 4, the apparatus can comprise:

a feature information determining module 410, used for, after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

a first data category determining module 420, used for determining data categories of the to-be-cleaned files based on the obtained first-type feature information of the to-be-cleaned files;

a second data category determining module 430, used for determining data categories of the to-be-cleaned folders based on the obtained second-type feature information of the to-be-cleaned folders;

a data presenting module 440, used for presenting the to-be-cleaned files and the to-be-cleaned folders in accordance with an order set based on the data categories and with a rule of presenting to-be-cleaned data of a same data category in a centralized manner.

In the embodiment of the present application, after identifying the to-be-cleaned data comprising to-be-cleaned files and to-be-cleaned folders located in the storage space of the electronic device, the first-type feature information of the to-be-cleaned files and the second-type feature information of the to-be-cleaned folders are determined; data categories of the to-be-cleaned files are determined based on the obtained first-type feature information of the to-be-cleaned files; data categories of the to-be-cleaned folders are determined based on the obtained second-type feature information of the to-be-cleaned folders; the to-be-cleaned files and the to-be-cleaned folders are presented in accordance with an order set based on the data categories and with a rule of presenting to-be-cleaned data of a same data category in a centralized manner. Compared with the prior art, the present solution determines the data categories of the to-be-cleaned data based on the feature information of the to-be-cleaned data, and presents the to-be-cleaned data in accordance with an order set based on the data categories and with a rule of presenting to-be-cleaned data of a same data category in a centralized manner, so that the presentation of the to-be-cleaned data has a certain regularity, thereby the efficiency of processing the to-be-cleaned data by a user is improved.

Figure 5:
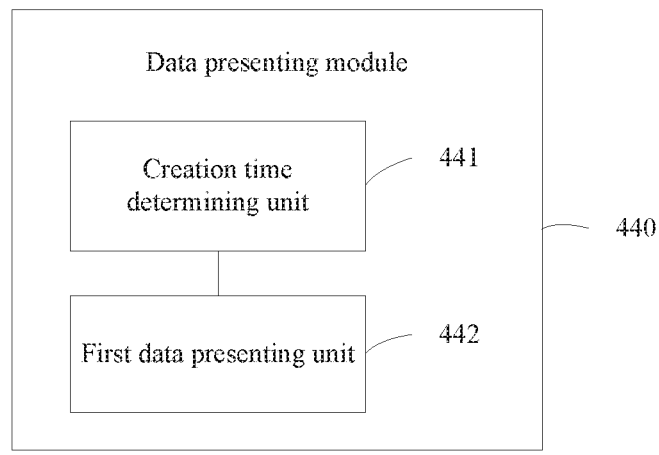
FIG. 5 is a schematic view of the structure of a data presenting module comprised in an apparatus for presenting to-be-cleaned data provided by an embodiment of the present application.

Specifically, in one implementation, as shown in FIG. 5, the data presenting module 440 can comprise:

a creation time determining unit 441, used for determining creation time of the to-be-cleaned files and the to-be-cleaned folders;

a first data presenting unit 442, used for presenting the to-be-cleaned files and the to-be-cleaned folders in accordance with an order set based on the data categories and with a rule of presenting to-be-cleaned data of a same data category, which are sorted based on the creation time, in a centralized manner.

Figure 6:
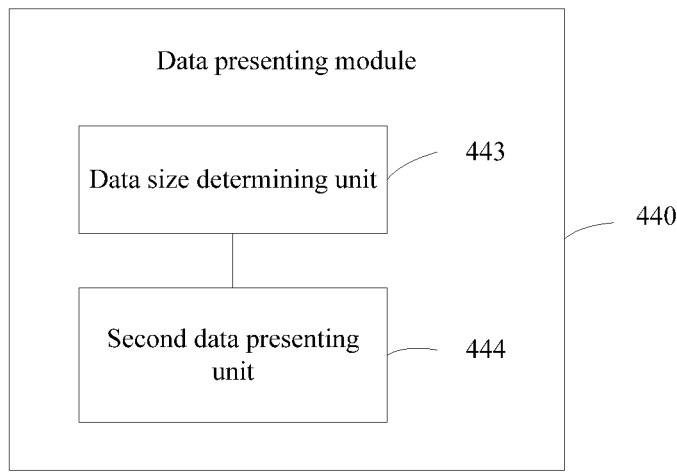
FIG. 6 is another schematic view of the structure of a data presenting module comprised in an apparatus for presenting to-be-cleaned data provided by an embodiment of the present application.

Specifically, in another implementation, as shown in FIG. 6, the data presenting module 440 can comprise:

a data size determining unit 443, used for determining data sizes of the to-be-cleaned files and the to-be-cleaned folders;

a second data presenting unit 444, used for presenting the to-be-cleaned files and the to-be-cleaned folders in accordance with an order set based on the data categories and with a rule of presenting to-be-cleaned data of a same data category, which are sorted based on the data sizes, in a centralized manner.

Specifically, the data categories can comprise: a first category of data being a reloadable file/folder, a second category of data being a personal file/folder, a third category of data other than the first category of data and the second category of data;

wherein the reloadable file/folder comprises a file/folder that can be automatically generated and automatically loaded again after having been deleted;

the personal file/folder comprises at least one of: a folder which is generated during runtime of application software to store files created by a user; a folder created by a user in a folder of application software to store files created by the user; and a file created by a user.

Specifically, the order can comprise:

an order of categories of data: the first category of data, the third category of data, and the second category of data.

Specifically, the first-type feature information can comprise at least one of: a file type, a file path, and a file name;

the second-type feature information can comprise at least one of: a folder name, a folder path, and a file type within a folder.

Specifically, the feature information determining module 410 comprises a to-be-cleaned data identifying unit for identifying the to-be-cleaned data comprising to-be-cleaned files and to-be-cleaned folders located in the storage space of the electronic device;

the to-be-cleaned data identifying unit can comprise:

a scanning subunit, used for scanning files and folders located in the storage space of the electronic device;

a feature information obtaining subunit, used for obtaining data sizes and third-type feature information of the scanned files, and fourth-type feature information of the scanned folders;

an operation folder determining subunit, used for determining folders, among the scanned folders, whose fourth-type feature information conforms to preset folder feature information as operational folders;

an intermediate folder determining subunit, used for determining folders, among the determined operational folders, which do not conform to a preset conventional junk judging condition as intermediate folders;

an intermediate folder processing subunit, used for determining whether each of the intermediate folders is a to-be-cleaned folder based on data sizes of files it contains;

a to-be-cleaned file determining subunit, used for determining files, other than files in operational folders, whose data sizes exceed a first predetermined data size threshold and whose third-type feature information does not conform to preset file feature information as to-be-cleaned files;

a to-be-cleaned data determining subunit, used for determining the to-be-cleaned files and the to-be-cleaned folders as the to-be-cleaned data.

Figure 7:
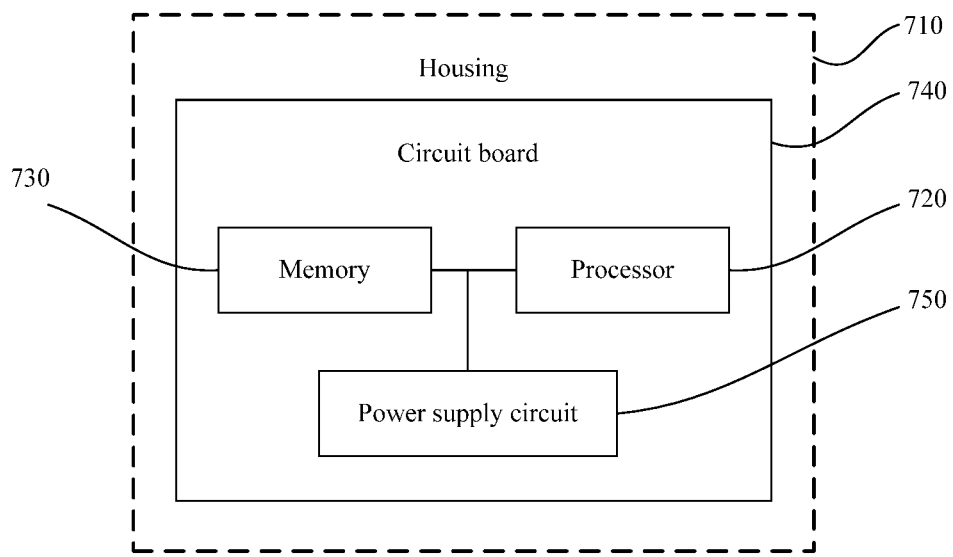
FIG. 7 is a schematic view of the structure of an electronic device provided by an embodiment of the present application.

In addition, the embodiments of the present application also provide an electronic device as shown in FIG. 7, which can comprise a housing 710, a processor 720, a memory 730, a circuit board 740 and a power supply circuit 750, wherein the circuit board 740 is disposed inside the space enclosed by the housing 710, the processor 720 and the memory 730 are provided on the circuit board 740; the power supply circuit 750 is used for supplying power to various circuits or components of the electronic device, and the memory 730 is used for storing executable program code; the processor 720 executes the program corresponding to the executable program code by reading the executable program code stored in the memory 730 to perform the following steps:

after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

determining data categories of the to-be-cleaned files based on the obtained first-type feature information of the to-be-cleaned files;

determining data categories of the to-be-cleaned folders based on the obtained second-type feature information of the to-be-cleaned folders;

presenting the to-be-cleaned files and the to-be-cleaned folders in accordance with an order set based on data categories and with a rule of presenting to-be-cleaned data of a same data category in a centralized manner.

The specific execution process of the processor 720 for the above steps and further execution of the processor 720 by executing the executable program code could refer to the description of embodiments shown in FIG. 1-6 of the present application and will not be repeated herein.

The electronic device provided in the embodiment of the present application determines, after identifying the to-be-cleaned data comprising to-be-cleaned files and to-be-cleaned folders in storage space of the electronic device, first-type feature information of the to-be-cleaned files and second-type feature information of the to-be-cleaned folders; determines data categories of the to-be-cleaned files based on the obtained first-type feature information of the to-be-cleaned files; determines data categories of the to-be-cleaned folders based on the obtained second-type feature information of the to-be-cleaned folders; presents the to-be-cleaned files and the to-be-cleaned folders in accordance with an order set based on data categories and with a rule of presenting to-be-cleaned data of a same data category in a centralized manner. Compared with the prior art, the present solution determines the data categories of the to-be-cleaned data based on the feature information of the to-be-cleaned data, and presents the to-be-cleaned data in accordance with an order set based on data categories and with a rule of presenting to-be-cleaned data of a same data category in a centralized manner, so that the presentation of the to-be-cleaned data has a certain regularity, thereby the efficiency of processing the to-be-cleaned data by a user is improved.

This electronic device is present in a variety of forms, which comprises but is not limited to:

(1) a mobile communication device: such device is characterized in ability of mobile communication and mainly aims to provide voice and data communication. Such terminal comprises: smart phones (such as iPhones), multimedia phones, functional phones, and low-end mobile phone and the like.

(2) an ultra-mobile personal computer device: such device belongs to the category of personal computers, which has functions of computing and processing and generally has mobile networking features. Such terminal comprises: PDA, MID and UMPC device and the like, such as iPads.

(3) a portable entertainment device: such device can display and play multimedia content. Such device comprises: audio and video player (such as iPods), handheld game consoles, e-books, and smart toys and portable vehicle navigation devices.

(4) a server: a device providing computing service. A server is consisted of a processor, a hard disk, a memory, system bus and on the like. The server is similar to a general computer in architecture, but has a higher requirement in aspects such as processing ability, stability, reliability, security, scalability, manageability due to the need to provide high reliable services.

(5) other electronic devices with data interaction functions.

Further, an embodiment of the present application further provides an application program for performing the method for presenting to-be-cleaned data provided by the embodiments of the present application when being executed. The method for presenting to-be-cleaned data comprises:

after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

determining data categories of the to-be-cleaned files based on the obtained first-type feature information of the to-be-cleaned files;

determining data categories of the to-be-cleaned folders based on the obtained second-type feature information of the to-be-cleaned folders;

presenting the to-be-cleaned files and the to-be-cleaned folders in accordance with an order set based on the data categories and with a rule of presenting to-be-cleaned data of a same data category in a centralized manner.

In embodiments of the present application, after identifying the to-be-cleaned data comprising to-be-cleaned files and to-be-cleaned folders located in the storage space of the electronic device, the first-type feature information of the to-be-cleaned files and the second-type feature information of the to-be-cleaned folders are determined; data categories of the to-be-cleaned files are determined based on the obtained first-type feature information of the to-be-cleaned files; data categories of the to-be-cleaned folders are determined based on the obtained second-type feature information of the to-be-cleaned folders; the to-be-cleaned files and the to-be-cleaned folders are presented in accordance with an order set based on the data categories and with a rule of presenting to-be-cleaned data of a same data category in a centralized manner. Compared with the prior art, the present solution determines the data categories of the to-be-cleaned data based on the feature information of the to-be-cleaned data, and presents the to-be-cleaned data in accordance with an order set based on the data categories and with a rule of presenting to-be-cleaned data of a same data category in a centralized manner, so that the presentation of the to-be-cleaned data has a certain regularity, thereby the efficiency of processing the to-be-cleaned data by a user is improved.

Further, an embodiment of the present application also provides a storage medium for storing executable program code which performs the method for presenting to-be-cleaned data provided by the present embodiment when being executed. The method for presenting to-be-cleaned data comprises:

after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

determining data categories of the to-be-cleaned files based on the obtained first-type feature information of the to-be-cleaned files;

determining data categories of the to-be-cleaned folders based on the obtained second-type feature information of the to-be-cleaned folders;

presenting the to-be-cleaned files and the to-be-cleaned folders in accordance with an order set based on the data categories and with a rule of presenting to-be-cleaned data of a same data category in a centralized manner.

In the embodiment of the present application, after identifying the to-be-cleaned data comprising to-be-cleaned files and to-be-cleaned folders located in the storage space of the electronic device, the first-type feature information of the to-be-cleaned files and the second-type feature information of the to-be-cleaned folders are determined; data categories of the to-be-cleaned files are determined based on the obtained first-type feature information of the to-be-cleaned files; data categories of the to-be-cleaned folders are determined based on the obtained second-type feature information of the to-be-cleaned folders; the to-be-cleaned files and the to-be-cleaned folders are presented in accordance with an order set based on the data categories and with a rule of presenting to-be-cleaned data of a same data category in a centralized manner. Compared with the prior art, the present solution determines the data categories of the to-be-cleaned data based on the feature information of the to-be-cleaned data, and presents the to-be-cleaned data in accordance with an order set based on the data categories and with a rule of presenting to-be-cleaned data of a same data category in a centralized manner, so that the presentation of the to-be-cleaned data has a certain regularity, thereby the efficiency of processing the to-be-cleaned data by a user is improved.

Each of the embodiments in this specification is described in a related manner, the same or similar parts between different embodiments can be referred to each other, and for each embodiment, the focus of description is placed on the difference(s) from other embodiments. In particular, for embodiments of apparatus, electronic devices, application programs, storage mediums, since they are substantially similar to the method embodiments, their description is relatively simple, and for the related aspects, one only needs to refer to portions of the description of the method embodiments.

It should be noted that, the relationship terms herein such as "first", "second" and the like, if any, are only used for distinguishing one entity or operation from another entity or operation, but do not necessarily require or imply that there is actual relationship or order between these entities or operations. Moreover, the terms "include", "comprise" or any other variants thereof are intended to cover a non-exclusive inclusion, so that processes, methods, articles, or apparatus comprising a series of elements comprise not only those elements listed but also those not specifically listed or the elements intrinsic to these processes, methods, articles, or device. Without further limitations, elements defined by the sentences "comprise(s) a . . . " or "include(s) a . . . " do not exclude that there are other identical elements in the processes, methods, articles, or apparatus which comprise these elements.

It could be understood by those with ordinary skills in the art that the implementation of all or part of the steps of the methods described above can be accomplished by a program instructing related hardware, the program can be stored in a computer-readable storage medium, such as: ROMs/RAMs, magnetic disks, or compact discs and so on.

Embodiments described above are just preferred embodiments of the present application, and are not intended to limit the scope of the present application. Any modifications, equivalent replacements, improvements or the like within the spirit and principle of the present application should be included in the scope of the present application.

What is claimed is:

1. A method for presenting to-be-cleaned data which is applied to an electronic device, wherein the method comprises:

after identifying to-be-cleaned data comprising to-be-cleaned files and to-be-cleaned folders located in storage space of the electronic device, obtaining first-type feature information of the to-be-cleaned files and second-type feature information of the to-be-cleaned folders;

determining data categories of the to-be-cleaned files based on the obtained first-type feature information of the to-be-cleaned files;

determining data categories of the to-be-cleaned folders based on the obtained second-type feature information of the to-be-cleaned folders;

presenting the to-be-cleaned files and the to-be-cleaned folders in accordance with an order set based on the data categories and with a rule of presenting to-be-cleaned data of a same data category in a centralized manner, wherein the data categories comprise: a first category of data being a reloadable file/folder, a second category of data being a personal file/folder, a third category of data other than the first category of data and the second category of data;

wherein the reloadable file/folder comprises a file/folder that can be automatically generated and automatically loaded again after having been deleted;

the personal file/folder comprises at least one of: a folder which is generated during runtime of application software to store files created by a user; a folder created by a user in a folder of application software to store files created by the user; and a file created by a user.

2. The method of claim 1, wherein presenting the to-be-cleaned files and the to-be-cleaned folders in accordance with an order set based on the data categories and with a rule of presenting to-be-cleaned data of a same data category in a centralized manner, comprises:

determining creation time of the to-be-cleaned files and the to-be-cleaned folders;

presenting the to-be-cleaned files and the to-be-cleaned folders in accordance with an order set based on the data categories and with a rule of presenting to-be-cleaned data of a same data category, which are sorted based on the creation time, in a centralized manner.

3. The method of claim 1, wherein presenting the to-be-cleaned files and the to-be-cleaned folders in accordance with an order set based on the data categories and with a rule of presenting to-be-cleaned data of a same data category in a centralized manner, comprises:

determining data sizes of the to-be-cleaned files and the to-be-cleaned folders;

presenting the to-be-cleaned files and the to-be-cleaned folders in accordance with an order set based on the data categories and with a rule of presenting to-be-cleaned data of a same data category, which are sorted based on the data sizes, in a centralized manner.

4. The method of claim 1, wherein the order comprises:
an order of categories of data: the first category of data, the third category of data, and the second category of data.

5. The method of claim 1, wherein the first-type feature information comprises at least one of: a file type, a file path, and a file name;
the second-type feature information comprises at least one of: a folder name, a folder path, and a file type within a folder.

6. The method of claim 1, wherein identifying the to-be-cleaned data comprising to-be-cleaned files and to-be-cleaned folders located in the storage space of the electronic device, comprises:
scanning files and folders located in the storage space of the electronic device;
obtaining data sizes and third-type feature information of the scanned files, and fourth-type feature information of the scanned folders;
determining folders, among the scanned folders, whose fourth-type feature information conforms to preset folder feature information as operational folders;
determining folders, among the determined operational folders, which do not conform to a preset conventional junk judging condition as intermediate folders;
determining whether each of the intermediate folders is a to-be-cleaned folder based on data sizes of files it contains;
determining files, other than files in operational folders, whose data sizes exceed a first predetermined data size threshold and whose third-type feature information does not conform to preset file feature information as to-be-cleaned files;
determining the to-be-cleaned files and the to-be-cleaned folders as the to-be-cleaned data.

7. An electronic device, wherein it comprises a housing, a processor, a memory, a circuit board and a power supply circuit, wherein the circuit board is disposed inside the space enclosed by the housing, the processor and the memory are provided on the circuit board; the power supply circuit is used for supplying power to various circuits or components of the electronic device, and the memory is used for storing executable program code; the processor executes the program corresponding to the executable program code by reading the executable program code stored in the memory to perform operations comprising:
after identifying to-be-cleaned data comprising to-be-cleaned files and to-be-cleaned folders located in storage space of the electronic device, obtaining first-type feature information of the to-be-cleaned files and second-type feature information of the to-be-cleaned folders;
determining data categories of the to-be-cleaned files based on the obtained first-type feature information of the to-be-cleaned files;
determining data categories of the to-be-cleaned folders based on the obtained second-type feature information of the to-be-cleaned folders;
presenting the to-be-cleaned files and the to-be-cleaned folders in accordance with an order set based on the data categories and with a rule of presenting to-be-cleaned data of a same data category in a centralized manner,
wherein the data categories comprise: a first category of data being a reloadable file/folder, a second category of data being a personal file/folder, a third category of data other than the first category of data and the second category of data;
wherein the reloadable file/folder comprises a file/folder that can be automatically generated and automatically loaded again after having been deleted;
the personal file/folder comprises at least one of: a folder which is generated during runtime of application software to store files created by a user; a folder created by a user in a folder of application software to store files created by the user; and a file created by a user.

8. The electronic device of claim 7, wherein the operations further comprise:
determining creation time of the to-be-cleaned files and the to-be-cleaned folders;
presenting the to-be-cleaned files and the to-be-cleaned folders in accordance with an order set based on the data categories and with a rule of presenting to-be-cleaned data of a same data category, which are sorted based on the creation time, in a centralized manner.

9. The electronic device of claim 7, wherein the operations further comprise:
determining data sizes of the to-be-cleaned files and the to-be-cleaned folders;
presenting the to-be-cleaned files and the to-be-cleaned folders in accordance with an order set based on the data categories and with a rule of presenting to-be-cleaned data of a same data category, which are sorted based on the data sizes, in a centralized manner.

10. The electronic device of claim 7, wherein the order comprises:
an order of categories of data: the first category of data, the third category of data, and the second category of data.

11. The electronic device of claim 7, wherein the first-type feature information comprises at least one of: a file type, a file path, and a file name;
the second-type feature information comprises at least one of: a folder name, a folder path, and a file type within a folder.

12. The electronic device of claim 7, wherein the operations further comprise identifying the to-be-cleaned data comprising to-be-cleaned files and to-be-cleaned folders located in the storage space of the electronic device, which comprises:
scanning files and folders located in the storage space of the electronic device;
obtaining data sizes and third-type feature information of the scanned files, and fourth-type feature information of the scanned folders;
determining folders, among the scanned folders, whose fourth-type feature information conforms to preset folder feature information as operational folders;
determining folders, among the determined operational folders, which do not conform to a preset conventional junk judging condition as intermediate folders;
determining whether each of the intermediate folders is a to-be-cleaned folder based on data sizes of files it contains;
determining files, other than files in operational folders, whose data sizes exceed a first predetermined data size threshold and whose third-type feature information does not conform to preset file feature information as to-be-cleaned files;
determining the to-be-cleaned files and the to-be-cleaned folders as the to-be-cleaned data.

13. A non-transitory storage medium, wherein the storage medium is used for storing executable program code, the executable program code being executed to perform the method for presenting to-be-cleaned data of claim 1.

* * * * *